United States Patent [19]

Yoshimura et al.

[11] Patent Number: 5,105,926

[45] Date of Patent: Apr. 21, 1992

[54] SLIP CONTROL SYSTEM FOR TORQUE CONVERTER OF AUTOMATIC TRANSMISSION

[75] Inventors: Hiroshi Yoshimura; Takuji Fujiwara; Kozo Ishii; Kazuo Takemoto, all of Hiroshima, Japan

[73] Assignee: Mazda Motor Corporation, Hiroshima, Japan

[21] Appl. No.: 758,487

[22] Filed: Sep. 9, 1991

Related U.S. Application Data

[63] Continuation of Ser. No. 457,567, Dec. 27, 1989, abandoned.

[30] Foreign Application Priority Data

| Dec. 28, 1988 | [JP] | Japan | 63-335410 |
| Mar. 10, 1989 | [JP] | Japan | 1-59434 |
| Aug. 25, 1989 | [JP] | Japan | 1-219032 |
| Aug. 25, 1989 | [JP] | Japan | 1-219033 |

[51] Int. Cl.⁵ .................................... B60K 41/28
[52] U.S. Cl. .................... 192/0.032; 192/0.076
[58] Field of Search ........... 192/0.032, 0.076, 0.096, 192/3.31; 475/65

[56] References Cited

U.S. PATENT DOCUMENTS

| 4,577,737 | 3/1986 | Niikura et al. | 192/0.032 |
| 4,580,671 | 4/1986 | Matsuoka et al. | 192/0.076 |
| 4,618,041 | 10/1986 | Sotoyama et al. | 192/0.076 |
| 4,640,396 | 2/1987 | Nishimura | 192/0.032 |
| 4,660,697 | 4/1987 | Yoneda et al. | 192/0.076 |
| 4,669,441 | 6/1987 | Okimoto | 192/3.31 |
| 4,687,083 | 8/1987 | Sotoyama et al. | 192/3.31 |
| 4,698,988 | 10/1987 | Swisher | 70/34 |
| 4,720,003 | 1/1988 | Murasugi | 192/0.076 |
| 4,821,190 | 4/1989 | Patil | 192/0.032 |

FOREIGN PATENT DOCUMENTS

| 57-332532 | 2/1982 | Japan . |
| 62-297567 | 12/1987 | Japan . |

*Primary Examiner*—Leslie A. Braun
*Assistant Examiner*—Nicholas Whitelaw
*Attorney, Agent, or Firm*—Fleit, Jacobson, Cohn, Price, Holman & Stern

[57] ABSTRACT

A slip control system for a torque converter of an automatic transmission includes lock-up clutch device provided in a torque converter for connecting an input and output members of the torque converter directly. A torque detecting device detects a transmitted torque introduced into the output member of the torque converter, a speed difference setting device sets a target value of a rotation speed difference between the input and output members, a pressure difference control device controls a pressure difference between a releasing chamber and an engaging chamber of the lock-up clutch device, based on a predetermined relationship between the input torque and the speed difference so as to accomplish the target value of the speed difference, and a speed difference detecting device detects an actual speed difference between the input and output members. In a preferred embodiment of the invention, a compensatng device compensates the target value of the speed difference set by the speed difference setting device based on a deviation between the actual and target speed difference. A responsive slip control, therefore, can be accomplished.

4 Claims, 16 Drawing Sheets

SLIP CONTROL SYSTEM FOR TORQUE CONVERTER OF AUTOMATIC TRANSMISSION

CROSS-REFERENCE TO RELATED APPLICATIONS

This is a continuation of application Ser. No. 07/457,567, filed Dec. 27, 1989, now abandoned.

This application relates to U.S. patent application Ser. Nos. 242,282, filed on Sep. 8, 1988 entitled "TORQUE CONVERTER SLIP CONTROL DEVICE", 250,603, filed on Sep. 29, 1988 by Fumiaki Baba et al., entitled "LOCK-UP CONTROL SYSTEM FOR AUTOMATIC TRANSMISSION", 293,689, filed on Jan. 5, 1989 entitled "SLIP CONTROL SYSTEM FOR LOCK-UP CLUTCH OF AUTOMATIC TRANSMISSION", 310,333, filed on Feb. 14, 1989 entitled "SLIP CONTROL SYSTEM FOR TORQUE CONVERTER OF AUTOMATIC TRANSMISSION", and a U.S. patent application filed on Oct. 31, 1989 by Hiroshi YOSHIMURA et al, entitled "CONTROL SYSTEM FOR TORQUE CONVERTER OF AUTOMATIC TRANSMISSION", which are assigned to the same assignee as the present application.

BACKGROUND OF THE INVENTION

1. Field of the Invention

The present invention relates to a torque converter for an automatic transmission having a lock-up clutch, and more specifically, to a slip control system for the lock-up clutch.

2. Description of the Prior Art

In the field of a torque converter incorporated in an automatic transmission of an automotive vehicle, a lock-up clutch mechanism has been proposed which provides a direct connection between an engine output member and an input member of the transmission under a predetermined vehicle operating condition which there occurs no amplification of a torque, or no change in torque from an engine so that fuel consumption performance of the vehicle is improved. When the lock-up clutch mechanism is engaged, the torque from the engine is transmitted so as to bypass the torque converter to the transmission through the lock-up clutch mechanism. Under this operation, it is advantageous in that the fuel consumption performance can be improved because there is no energy loss caused by a fluid friction in the torque converter. On the other hand, it is disadvantageous in that the torque amplification and a shock absorbing function of the torque converter cannot be obtained, thereby deteriorating a riding comfort.

In view of the above characteristics of the lock-up mechanism of the torque converter, Japanese Patent Public Disclosure (KOKAI) No. 62-297567, laid open to the public on Dec. 24, 1987, discloses a slip control system for a transmission of motor vehicle having a torque converter and lock-up clutch mechanism wherein the lock-up clutch mechanism is constituted by a converter cover connected with an engine output shaft and a damper piston connected with a turbine shaft, with the damper piston being brought into frictional engagement with the converter cover in accordance with a hydraulic pressure introduced into hydraulic chambers formed at front and back sides of the damper piston. The transmission is adapted to carry out a slip control in which the lock-up clutch allows a certain slippage so as to take selectively a lock-up condition, wherein an engine torque is transmitted through only the lock-up clutch mechanism, a converter condition, wherein the engine torque is transmitted through only the torque converter, and a slip condition, wherein the engine torque is transmitted through both the lock-up clutch and the torque converter.

Japanese Patent Public Disclosure No. 57-33253 (corresponding to U.S. Pat. No. 4,468,988 issued on Sep. 4, 1984) laid open to the public in 1982, discloses a slip control system for establishing a proper slip condition wherein respective rotation speeds of input and output members of the torque converter are detected and a hydraulic pressure for controlling the lock-up clutch is controlled so as to cause a rotation speed difference between the input and output members to converge to a predetermined value by means of a feedback control. U.S. Pat. Nos. 4,580,671, 4,618,041, 4,669,441, 4,687,083, and 4,468,988 also disclose conventional transmission control systems.

However, in the conventional slip control systems, it may take unduly long before the rotation speed difference between the input and output members converges with to a target value in the feed back control, due to a change in the input torque introduced into the torque converter. Thus, the conventional control is not responsive in obtaining a desirable slip condition.

If a feedback control gain for controlling the hydraulic pressure for the lock-up clutch is increased to accomplish a responsive slip control, a hunting of the control may occur, resulting in a deterioration of the stability of the slip control.

In a case where the hydraulic pressure is maintained at a constant value for obtaining the target speed difference, it is difficult to provide a proper slip condition corresponding to the input torque which changes in accordance with the engine operating condition and vehicle operating condition. In particular, in a transient condition or such as acceleration, deceleration of the vehicle and the like, the above problems would be remarkable.

SUMMARY OF THE INVENTION

It is, therefore, an object of the present invention to provide a responsive slip control system for an automatic transmission with a lock-up clutch.

It is another object of the present invention to provide a hydraulic control system for an automatic transmission which selectively takes a lock-up condition, a converter condition and a slip condition in accordance with a vehicle operating condition.

It is still another object of the present invention to provide a control system for a lock-up clutch of an automatic transmission which can accomplish a desirable slip condition of the lock-up clutch smoothly and quickly, even in a transient condition of the vehicle.

The above and other objects of the present invention can be accomplished by a slip control system for a torque converter of an automatic transmission comprising a lock-up clutch device provided in a torque converter for connecting an input and output members of the torque converter directly, input torque detecting means for detecting an input torque introduced into the torque converter, speed difference setting means for setting a target value of a rotation speed difference between the input and output members, pressure difference control means for controlling pressure difference between an releasing chamber and a engaging chamber of the lock-up clutch device based on a predetermined relationship between the input torque and the speed difference so as to accomplish the target value of the speed difference, speed difference detecting means for detecting an actual speed difference between the input and output members, and compensating means for compensating the target value of the speed difference set by the speed difference setting means based on a deviation between the actual and target speed differences.

According to the above slip control system of the present invention, the target speed difference is determined based on the actual speed difference in a manner such that an initial value of the target speed difference is compensated in accordance with a deviation between the actual value and the target value to be optimized. In optimizing the target speed difference, a compensating coefficient is set in accordance with the deviation utilizing a map.

The compensating coefficient is used for compensating the target value when the actual speed difference is greater than the target speed difference beyond a predetermined value so that the target value is reduced to thereby increase the pressure difference. In this case, the engaging force of the lock-up clutch means is increased. This makes the control responsive. Consequently, the actual speed difference is controlled to be effectively reduced. When the actual value is smaller than the target speed difference beyond a predetermined value, the target value is increased to thereby reduce the pressure difference. In this case, the engaging force of the lock-up clutch is reduced. Consequently, the actual speed difference is controlled to be increased effectively so as to cause the actual speed difference to converge with the target value.

In a preferred embodiment of the present invention, the slip control system comprises a lock-up clutch device provided in a torque converter for connecting input and output members of the torque converter directly, input torque detecting means for detecting an input torque introduced into the torque converter, speed difference setting means for setting a target value of a rotation speed difference between the input and output members, pressure difference setting means for setting a target pressure difference between a releasing chamber and an engaging chamber of the lock-up clutch device based on a predetermined relationship between the input torque and the speed difference, pressure control means for controlling a hydraulic pressure so as to accomplish the target pressure difference, speed difference detecting means for detecting an actual speed difference between the input and output members, and compensating means for compensating the target pressure difference set by the pressure difference setting means based on a deviation between the actual and target speed difference.

In this embodiment, the pressure difference set by the pressure difference setting means is compensated under a certain condition.

Preferably, a timer is provided for counting a time period for accomplishing the target speed difference. If the slip control goes on after the time period expires, the target pressure difference is compensated for facilitating the convergence of the speed difference.

If the actual speed difference is more than the target value beyond a predetermined value after the predetermined time period, the pressure difference is increased for the same values of the torque and the speed difference so that the lock-up clutch device is controlled to reduce the slippage.

On the other hand, if the actual speed difference is much smaller than the target value beyond a predetermined value, the pressure difference is decreased for the same values of the torque and the speed difference so that the lock-up clutch device is controlled to reduce the slippage.

The pressure difference may be compensated by a learning control wherein a learned value of the pressure difference is stored in place of an old one in the memory for next processing cycle of the routine. Thus, a responsive slip control can be maintained without influence due to aging or the like.

The above and other features of the present invention will be apparent from the following description and by making reference to the accompanying drawings.

DESCRIPTION OF THE PREFERRED EMBODIMENTS

Hereinafter there will be described preferred embodiments of the present invention making reference to the drawings referred to above.

Figure 1:
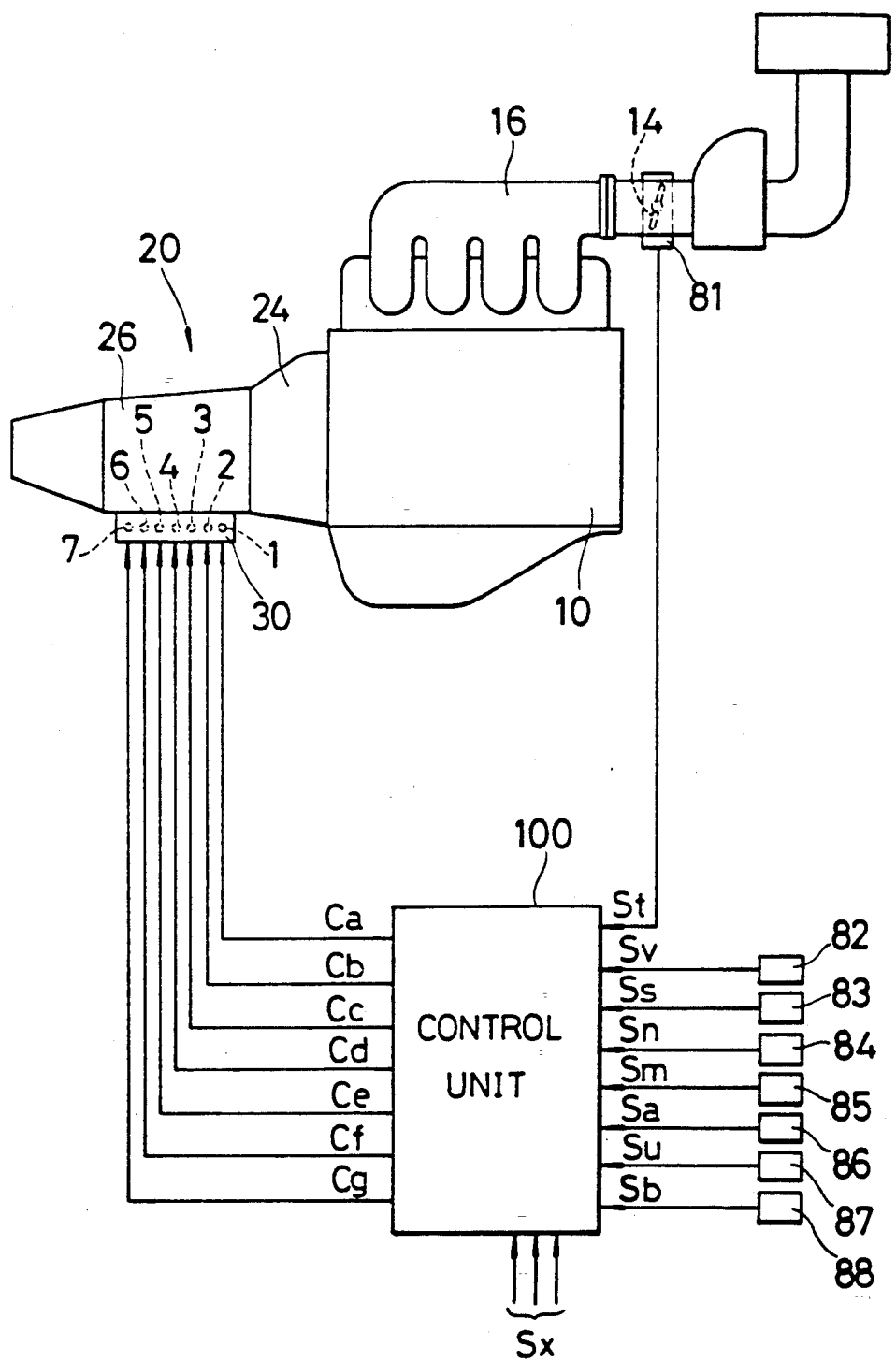
FIG. 1 is a schematic view of an automatic transmission to which a slip control system in accordance with the present invention can be applied.

Referring specifically to FIG. 1, there is shown a schematic view of a power plant of a vehicle to which the present invention can be applied.

The power plant is provided with a main body of an engine 10 and an automatic transmission 20. To each of four cylinders of the engine 10 is supplied a combustible mixture made by intake air and fuel through a fuel injector by way of an intake passage 16 having a throttle valve 14 for combustion therein. An engine output torque produced in the engine 10 is transmitted to wheels through a power train including the automatic transmission 20. In this engine, a fuel cut control is carried out when an engine speed is greater than a predetermined value and the throttle valve is entirely closed. Fuel supply resumes when the engine speed is decreased beyond a predetermined value.

The transmission 20 is provided with a torque converter 24, a multiple stage transmission gear mechanism 26 and a hydraulic circuit 30 including solenoid valves 1-5 for a shift control, lockup control solenoid valve 6 and regulating solenoid valve 7.

Figure 2:
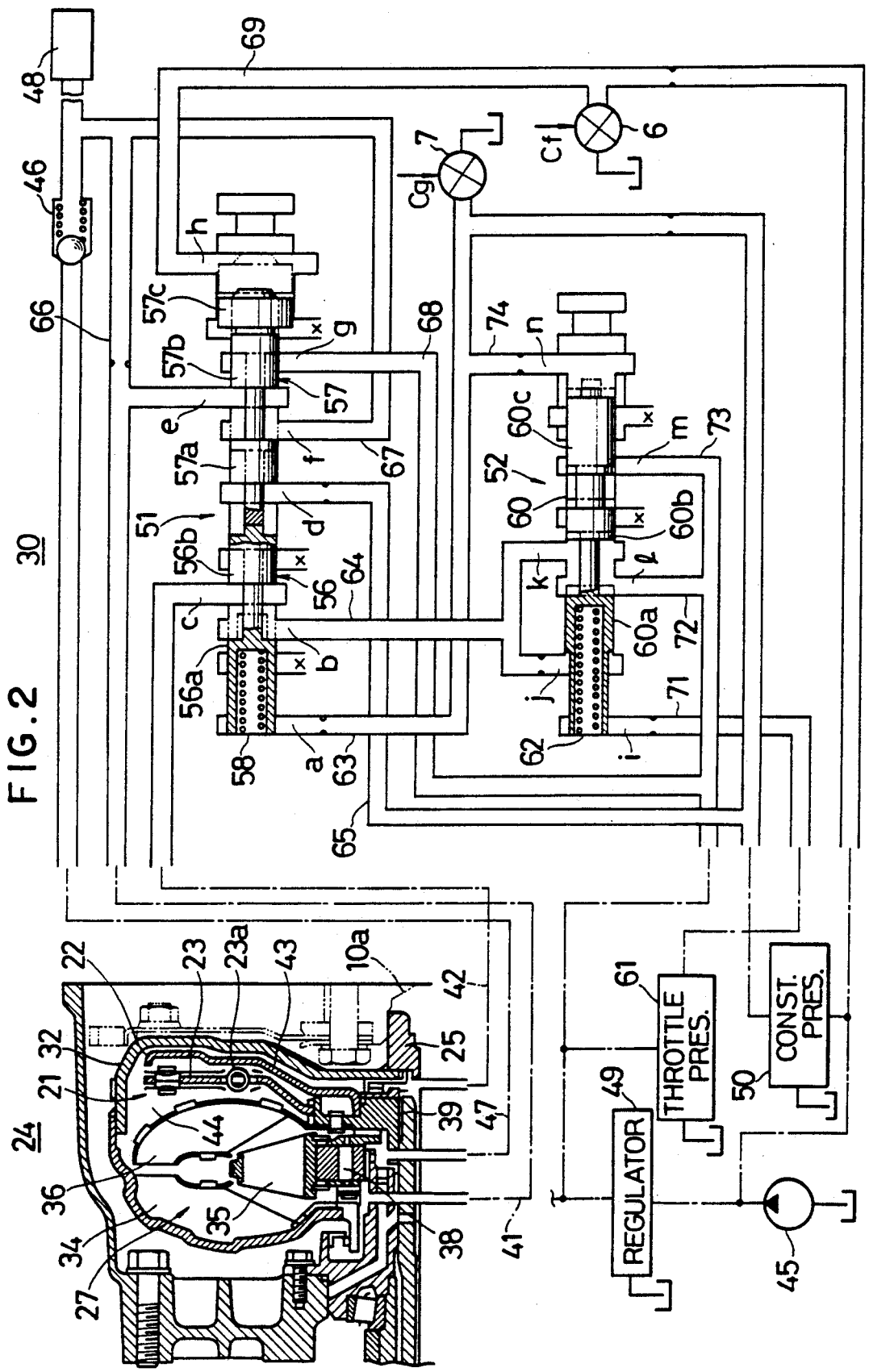
FIG. 2 is a hydraulic control circuit incorporated into the automatic transmission of FIG. 1 for controlling a lock-up mechanism.

As shown in FIG. 2, the torque converter 24 is provided between an input shaft 25 and an output shaft 39 with a converter section 27 for transmitting an engine torque through a hydraulic fluid and a lock-up clutch 21 for transmitting the torque to the gear mechanism 26 directly therethrough. The converter section 27 is provided with pump impeller 34 secured to a drive plate 32 to rotate together with the input shaft 25, turbine runner 36 rotating together with the output shaft 39, a stator 35 and a one-way clutch 38 disposed between the impeller 34 and the runner 36. The lock-up clutch 21 is provided with torsion damper 23 and a clutch plate connected with the torsion damper 23 through coil spring 23a.

There is formed a releasing (disengaging) chamber 43 defined by the clutch plate 22 and the drive plate 32. An engaging chamber 44 is formed opposite to the releasing chamber 43. A hydraulic pressure is introduced into the releasing chamber 43 through an oil passage 42 from the hydraulic circuit 30 for releasing the clutch 21 and to the engaging chamber 44 through a passage 41 for engaging the clutch plate 22.

The lock-up clutch 21 can take a lock-up condition in which the input shaft 25 is directly tied up with the output shaft 39 to transmit the engine torque when the hydraulic pressure is introduced into the engaging chamber 44, a converter condition in which the input shaft 25 is free from the output shaft 39 so that the engine torque is transmitted through the hydraulic fluid when the hydraulic pressure is introduced into the releasing chamber 43, and a slip condition in which the input shaft 25 is engaged with the output shaft 39 with allowing a certain relative rotation therebetween so that the engine torque is transmitted through both the lock-up clutch 21 and the hydraulic fluid when the hydraulic pressure is introduced into both the releasing and engaging chambers 43 and 44 to provide a certain range of a pressure difference dP between the two chambers. In this case, the slip condition approaches the lock-up condition as the pressure difference dP is increased. The engaging chamber 44 is connected with an oil cooler 48 through a check valve 46 by an oil passage 47. The control circuit 30 involving an operation of the torque converter 24 is provided with a lock-up shift valve 51, lock-up regulating valve 52, the lock-up control solenoid valve 6 and the regulating solenoid valve 7. The lock-up shift valve 51 is provided with a first spool 56 and a second spool 57 controlled by a hydraulic pressure of ports a, d and h to control communications of ports b, c and e-g. The lock-up regulating valve 52 is provided with a spool controlled by hydraulic pressure introduced into ports i and n to control communication of ports j-m thereof.

The port a of the lock-up shift valve 51 is subjected to a hydraulic pressure which is regulated by the solenoid valve 7 after a hydraulic pressure from the pump 45 is reduced to a constant value by a pressure adjusting section 50. The port d of the valve 51 between the first and second spools 56 and 57 receives the hydraulic pressure reduced by the pressure adjusting section 50. The port h receives a hydraulic pressure adjusted by the solenoid valve 6. Thus, the hydraulic pressures to the ports a, d and h are controlled so that the valve 51 functions to select one of the converter, lock-up and slip conditions of the torque converter 45.

The port i of the lock-up regulating valve 52 receives a throttle pressure Pt produced by a throttle pressure forming section 61 in correspondence with a throttle opening. The port n of the valve 52 receives a duty control pressure Pd adjusted by the solenoid valve 7 and the adjusting section 50. Thus, the valve 52 controls the pressure difference dP between the releasing and engaging chambers 43 and 44 so as to control the slippage between the input and output shaft 25 and 39.

An operation of the valve 51 and 52 is detailed in U.S. patent application filed on Oct. 31, 1989 by Hiroshi YOSHIMURA et al, entitled "CONTROL SYSTEM FOR TORQUE CONVERTER OF AUTOMATIC TRANSMISSION", assigned to the same assignee as the present invention. The U.S. application is incorporated herein by reference.

As shown in FIG. 1, there is provided a control unit 100 preferably including a microprocessor or microcomputer for the control circuit 30 which controls the supply of the hydraulic pressure of the torque converter 24. The control unit 100 produces signals Ca-Cg for controlling the shift control solenoid valves 1-5, lock-up control solenoid valve 6, and the regulating solenoid valve 7.

The control unit 100 receives a throttle opening signal St from a throttle opening sensor 81 for detecting a throttle opening Th of the throttle valve 14, a vehicle speed signal Sv from a vehicle speed sensor 82 for detecting a vehicle speed V, a shift position signal Ss from a position sensor 83 for detecting a position of shift lever, an engine speed signal Sn from an engine speed sensor 84 for detecting an engine speed Ne, a turbine speed signal Sm from a turbine speed sensor 85 for detecting a rotation speed of the turbine runner 36, an acceleration signal Sa from an acceleration sensor 86 for detecting an acceleration stroke of an acceleration pedal, a signal Su from a thermometer 87 for detecting a temperature of the hydraulic fluid for the automatic transmission 20, a brake signal Sb from a brake sensor 88 for detecting a braking stroke of a brake pedal and other signals Sx for controlling the transmission 20.

The control unit 100 carries out the control for the transmission 20 and the lock-up clutch 21 based on the above signals.

Figure 3:
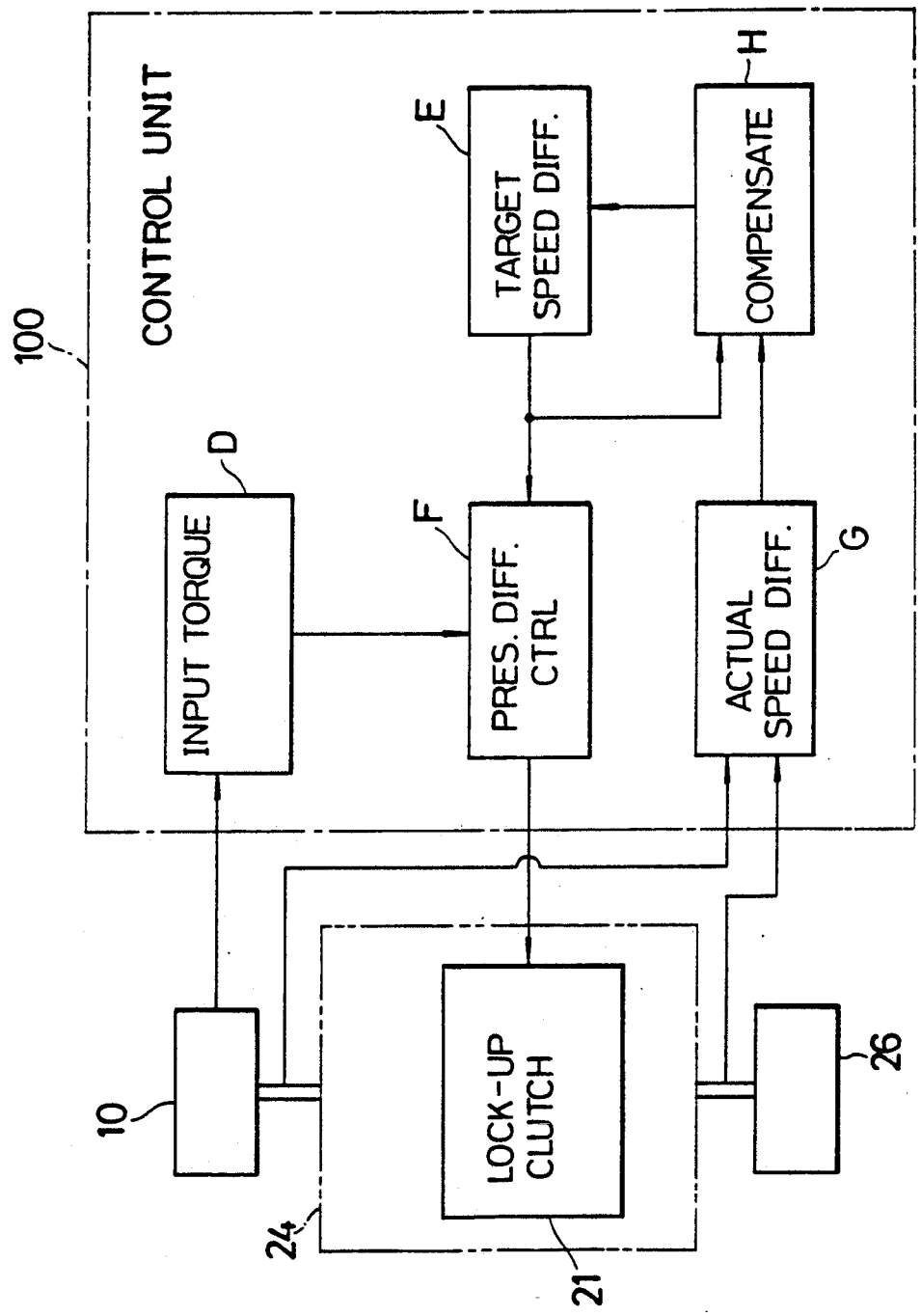
FIG. 3 is a block diagram of the slip control system in accordance with a preferred embodiment of the present invention.

As shown in FIG. 3, the control unit 100 is conceptually provided with a pressure difference control section F for controlling the pressure difference between the releasing and the engaging chambers 43 and 44, an input torque detecting section D, a target speed difference setting section E for setting a target speed difference between the input shaft 25 and the output shaft 39. Signals from the input torque detecting section D and the target speed difference setting section E are introduced into the pressure difference control section F so that the pressure difference control section F control the pressure difference so that is approaches the target value in correspondence with the target speed difference, taking into account the input torque. The control unit 100 is further provided with a speed difference detecting section G for detecting an actual speed difference between the input shaft 25 and the output shaft 39 and compensating section H for compensating the target speed difference based on the actual speed difference and the target speed difference.

Figure 4:
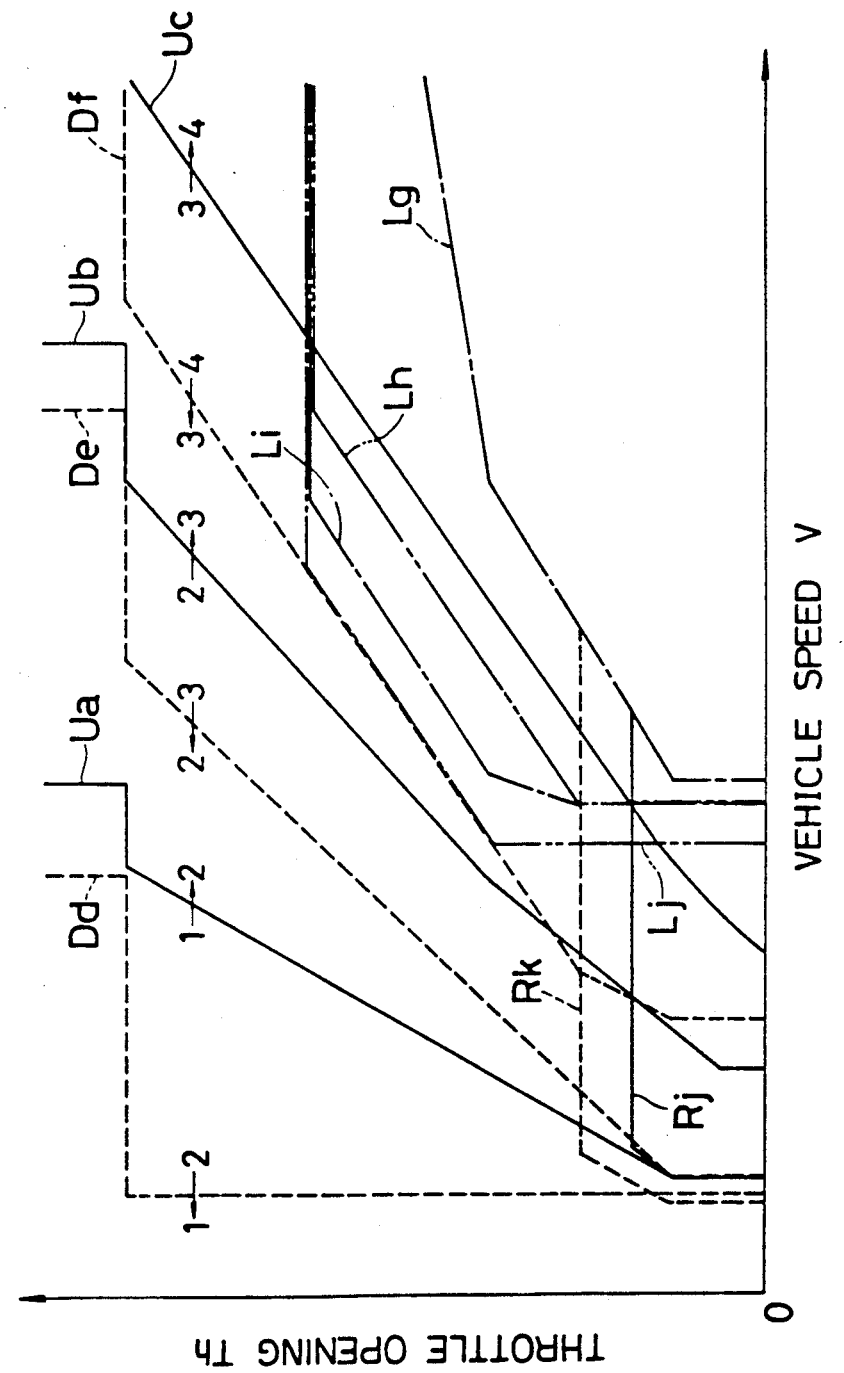
FIG. 4 is a diagram showing a shift pattern stored in a control unit.

In order to carry out the shift control of the automatic transmission 20, the control unit 100 figures out a present vehicle operating condition in light of a map of a shift pattern as shown in FIG. 4, which is memorized in a memory thereof. The shift pattern is defined by the throttle opening Th in ordinate and the vehicle speed V in abscissa and plural shift-up, and shift-down lines Ua, Ub and Ub, and Da, Db and Dc. When the vehicle operating condition is changed from left to right in FIG. 4 beyond any of the shift-up lines, the vehicle is in a shift-up condition. If the vehicle operating condition is changed from right to left in FIG. 4 beyond any of the shift-down lines, the vehicle is in a shift down condition. In addition, there are provided lock-up lines Lg(for the fourth stage), Li(for the third stage) wherein the lock-up condition is established on the right hand side of the lines. Likewise, lock-up release lines Lh(for the fourth stage), Lj(for the third stage) are provided wherein the lock-up condition is released on the left hand side of the lines in FIG. 4. Thus, the lines Lg, Li, Lh and Lj define a lock-up control zone of the vehicle operating condition. A slip control zone is defined by slip control lines Rj and Rk. When the vehicle operating condition is changed across the line Rj from a left or upper hand side of the line to a right or lower hand side thereof in FIG. 4, the slip control is initiated. On the other hand, when the vehicle operating condition is changed across the line Rk toward a left and upper hand side thereof, the slip control is released.

The control unit 100 produces control signals Ca–Ce for controlling the gear mechanism 26 to shift the gear stages based on the shift map of FIG. 4.

Where the vehicle operating condition does not satisfy the lock-up and slip control conditions, the control unit 100 closes the solenoid valves 6 and 7 in terms of signals Cf and Cg so that the valves 51 and 52 take positions as shown by real lines in FIG. 2, allowing the hydraulic pressure adjusted by the regulator valve 49 to be introduced into the releasing chamber 43 and the hydraulic pressure of the engaging chamber 44 to be exhausted to the oil cooler 48. As a result, the lock-up clutch 21 is released to establish the converter condition in which the engine torque is transmitted through the converter section 27. When the lock-up control condition is satisfied, the lock-up control solenoid valve 6 is opened in terms of the signal Cf, and the pressure adjusting solenoid valve 7 is kept closed in terms of the signal Cg. Thus, the lock-up shift valve 51 takes a position shown by a chain line in FIG. 2 and the lock-up adjusting valve 52 takes a position shown by the real line in FIG. 2 so that the hydraulic pressure adjusted by the regulator valve 49 is introduced into the engaging chamber 44, and the hydraulic pressure in the releasing chamber 43 is drained into an oil pan to establish the lock-up condition of the lock-up clutch 21.

The slip control condition is satisfied when the vehicle operating condition defined by the throttle opening Th and the vehicle speed V is in the slip control zone (normal slip control condition), when the vehicle operating condition is in a transitive condition in the case where the shift-up control condition is satisfied (shift slip control condition) and when the vehicle operating condition is in a transitive condition in the case where the shift-down condition is satisfied in terms of the throttle opening Th and the engine speed (deceleration slip control condition). In this case, the control signal Cf is supplied to the lock-up control solenoid valve 6 to be opened. The pressure adjusting control solenoid valve 7 is controlled to a predetermined opening in terms of the control signal Cg of a duty ratio d more than 20%.

As a result, the first spool 56 of the lock-up shift valve 51 takes a position of the real line and the second spool 57 thereof takes a position of the chain line in FIG. 2. The spool 60 of the pressure adjusting valve 52 is moved toward a position of a chain line and takes a position at which the throttle pressure Pt introduced into the port i is balanced with the duty control pressure Pd (which is reduced as duty ratio is increased). As a result, the hydraulic pressure adjusted by the regulator valve 49 is introduced into the engaging chamber 44. The releasing chamber 43 receives a hydraulic pressure which is reduced in accordance with the duty ratio to provide a slip condition of the lock-up clutch 21 corresponding to the pressure difference dP between the chambers 43 and 44 for producing a predetermined speed difference dN between the input shaft 25 and the output shaft 39.

The pressure difference is provided by the following formula;

$$dP = C1(Pt - Pd) + Fa/C2,$$

wherein Pt is throttle pressure, Pd is duty control pressure, Fa is a resilient force applied by the spring 62 to the lock-up clutch 21, and C1 and C2 are constant.

Figure 5:
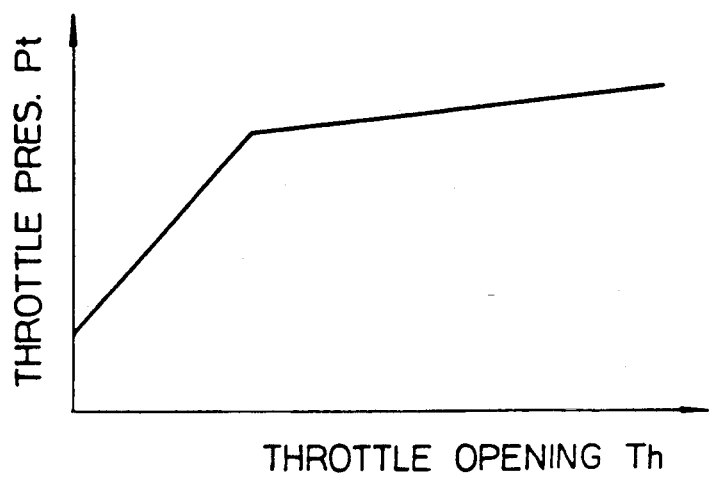
FIG. 5 is a graphical representation showing a throttle opening and a throttle pressure.
Figure 6:
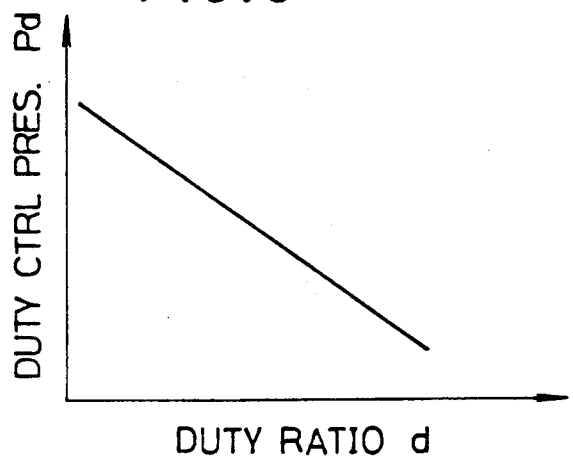
FIG. 6 is a graphical representation showing a relationship between a duty ratio of a solenoid valve and a duty control pressure.
Figure 7:
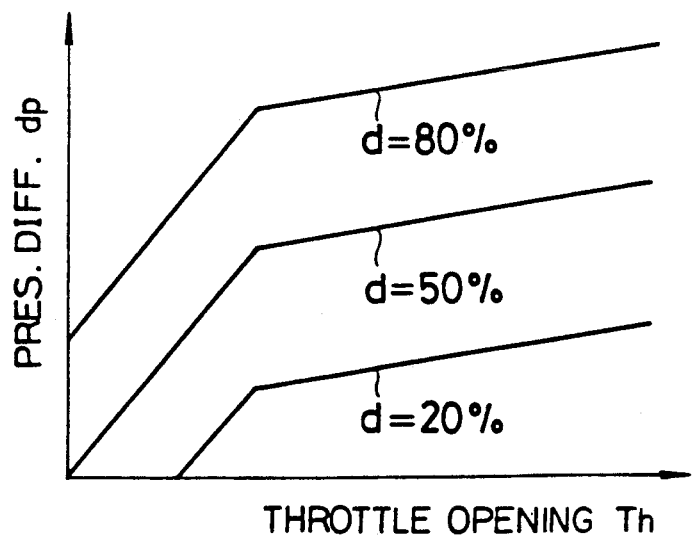
FIG. 7 is a graphical representation showing a relationship of a throttle opening, a duty ratio, and a pressure difference between line pressures to respective chambers of a torque converter.

In this case, a relationship between the throttle pressure Pt and the throttle opening Th is provided as shown in FIG. 5. The duty control pressure Pd is provided by the duty ratio d of the signal Cg as shown in FIG. 6. As a result, the pressure difference dP is provided by the throttle opening Th in accordance with the duty ratios d as shown in FIG. 7. The pressure difference dP is increased as the throttle opening Th and the duty ratio d are increased.

Figure 8:
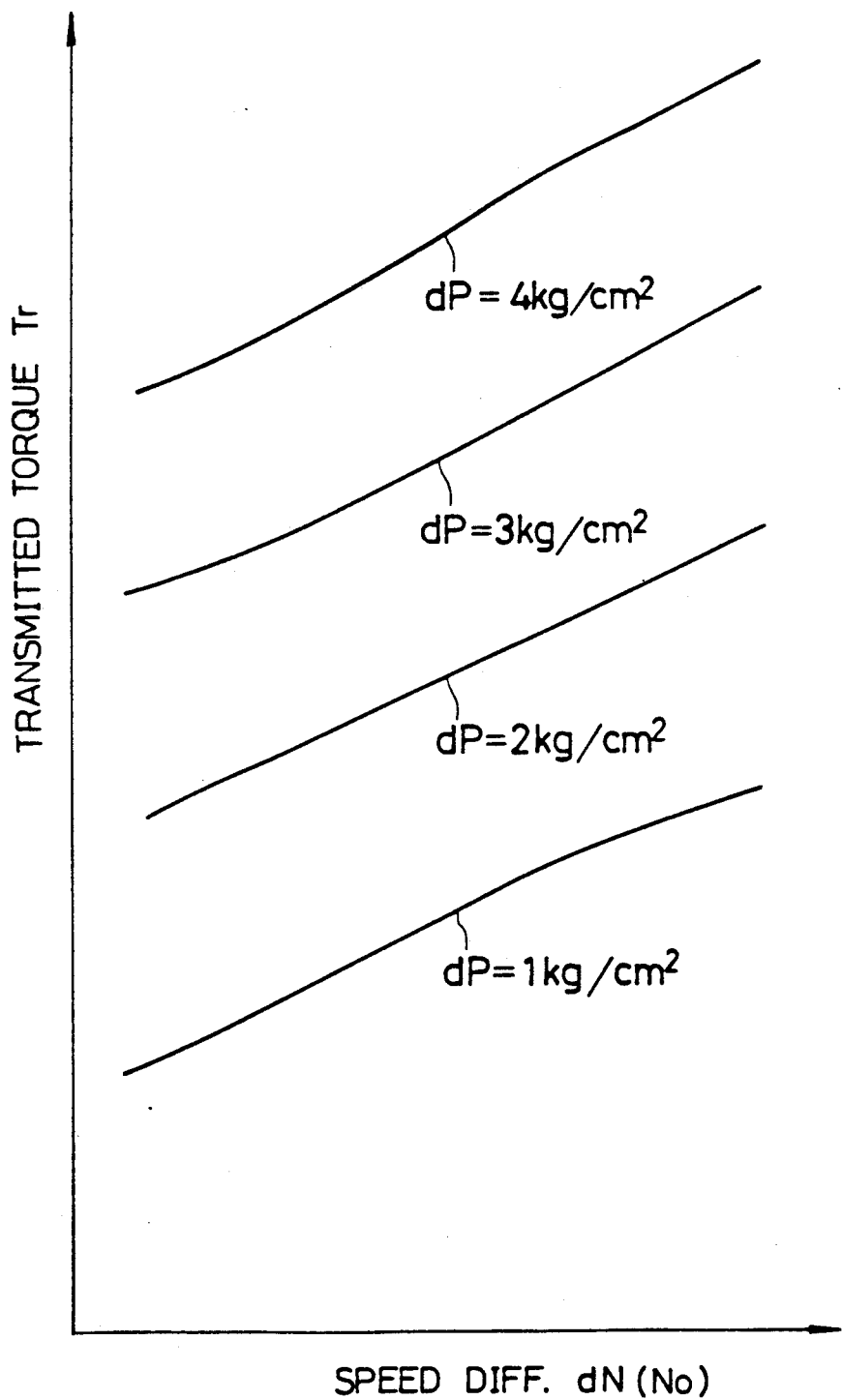
FIG. 8 is a graphical representation showing a relationship between input torque to a gear mechanism, speed difference of input shaft against output shaft of the transmission and the pressure difference.

A maximum torque Ts which can be transmitted through the lock-up clutch 21 is provided by the following formula;

$$Ts = dP \cdot \mu \cdot r \cdot A,$$

wherein $\mu$ is a frictional coefficient of the clutch plate 22, r is an effective diameter, and A is contact area of the plate 22. The maximum torque Ts is increased as the pressure difference dP is increased. An input torque Ti of the torque converter 24 is equal to an engine output torque Te. If the torque Ti or Te is greater than the Ts, the speed difference dN is produced. A relationship between a transmitted torque Tr or the output torque of the torque converter 24 and the speed difference between the input shaft 25 and the output shaft 39 dN(No) is provided in FIG. 8 in relation to the pressure difference dP adjusted within a range of 1–4 kg/cm2 as a parameter under a condition where the temperature of the hydraulic fluid is 90 degree centigrade.

In the normal slip control condition, the engine torque Te is detected based on the throttle opening Th and the engine speed Ne. The engine torque Te is obtained in light of a map providing a relationship between the torque Te and the engine speed Ne in relation to the throttle opening Th ($\frac{1}{8}$−6/8) as a parameter as shown by line a1-a6 in FIG. 9.

A transmitted torque Tr is obtained based on the engine torque Te which is compensated in accordance with a compensating coefficient K1 wherein the torque Tr is provided as Tr=K1*Te. The coefficient K1 is set at a value of 1 at a fluid temperature of 90 degrees centigrade. As the temperature is increased, the value of K1 is increased.

Figure 10:
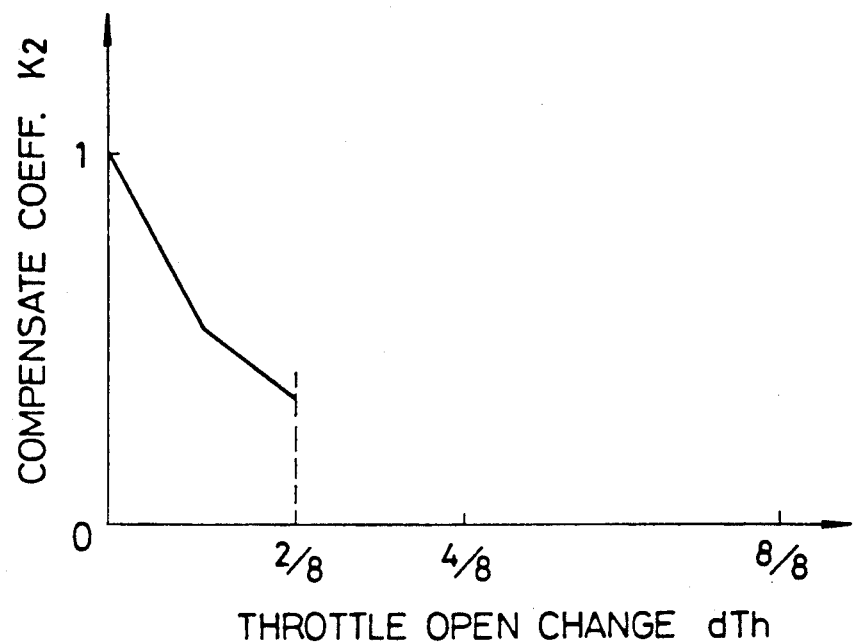
FIG. 10 is a graph for providing a compensating coefficient in terms of throttle opening change.

The torque Tr is compensated based on a change dTh of the throttle opening Th. In compensating the torque Tr, a compensating coefficient K2 is determined in accordance with the change dTh by utilizing a map as shown in FIG. 10. The coefficient K2 takes a value smaller than 1. The coefficient K2 is multiplied into the torque Tr to be compensated. When the value of the change dTh is increased greatly, the normal slip control condition may not be satisfied.

Figure 11:
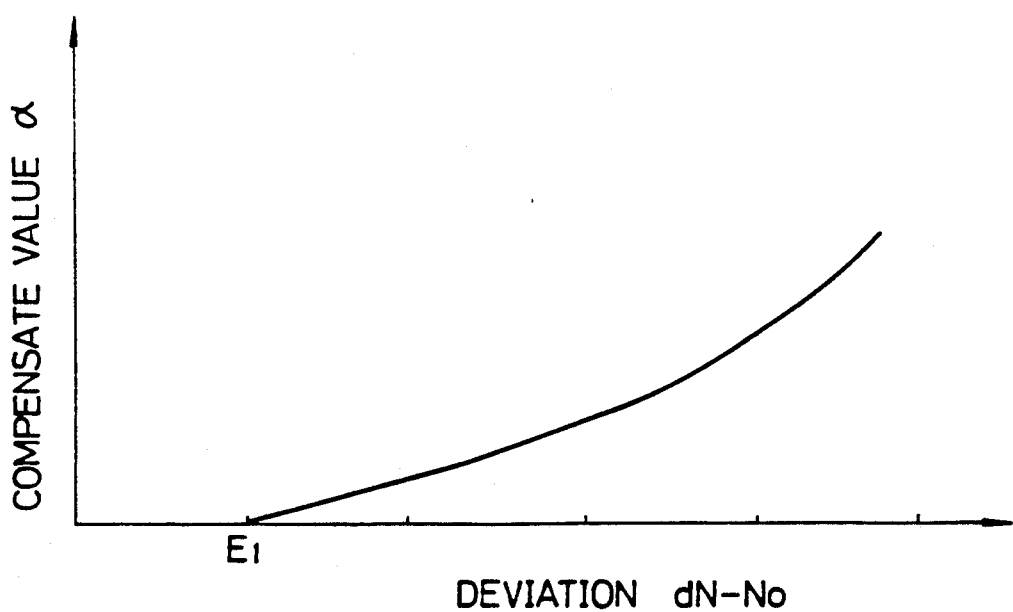
FIGS. 11, 12 and 13 are graphs for providing compensating values in terms of deviation of actual speed difference and target speed difference.
Figure 12:
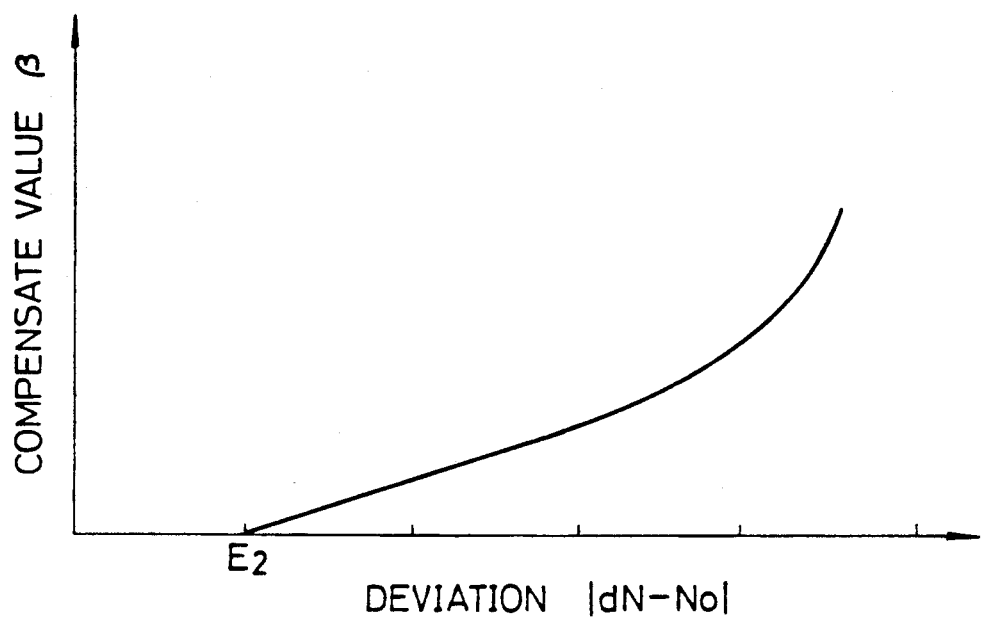

A target speed difference No is determined based on the actual speed difference dN in a manner that an initial value of the target speed difference No is compensated in accordance with a deviation dN-No between the actual value dN and the target value No to be optimized. In optimizing the target speed difference No, the value No is compensated by a coefficient $\alpha$ utilizing a map of FIG. 11 and a coefficient $\beta$ utilizing a map of FIG. 12.

The compensating value $\alpha$ is used for compensating the value No when the actual difference dN is greater than the target speed difference No beyond a predetermined value (E1 in this embodiment) wherein the target value No is compensated to be reduced to thereby increase the pressure difference dP. This makes the control responsive. Consequently, the actual speed difference dN is controlled to be effectively reduced. The compensating value $\beta$ is used for compensating the value No when the actual speed difference dN is smaller than the target speed difference No beyond a predetermined value (E2 in this embodiment) wherein the target value No is increased to thereby reduce the pressure difference dP. Consequently, the actual speed difference dN is controlled to be increased effectively so as to cause the actual speed difference dN to converge to the target value No.

Figure 13:
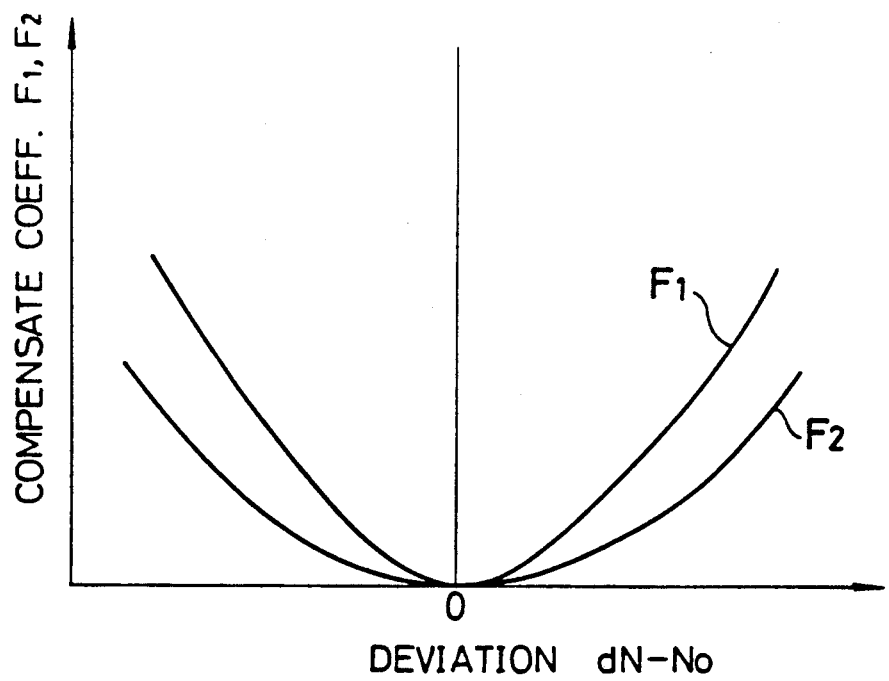

In determining the duty ratio d for the pressure adjusting solenoid valve 7, compensating values F1 and F2 are employed in accordance with the deviation dN-No in light of a map as shown in FIG. 13.

Hereinafter, there is described a procedure of an operation of the control unit 100 in carrying out the slip control in accordance with the present invention making reference to FIGS. 14–17.

Figure 14:
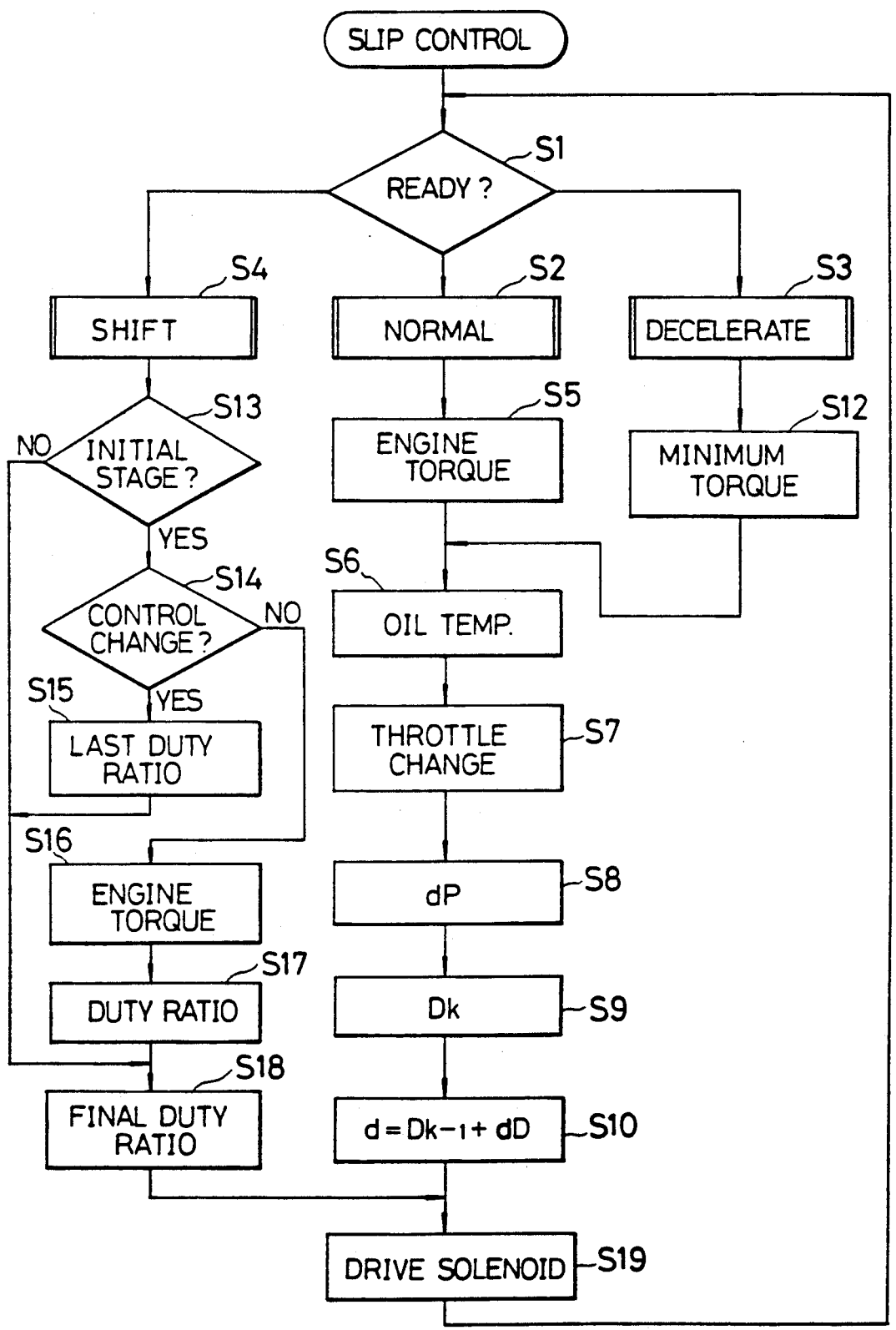
FIGS. 14–17 are flow charts of the slip control in accordance with the present invention.

Referring to FIG. 14, there is shown a flow chart of a main routine of the slip control. The control unit 100 judges the type of the slip control condition in step S1. That is, the control unit 100 judges whether the vehicle operating condition satisfies the shift slip control condition, the normal slip control condition or the deceleration slip control condition in terms of a routine shown in FIG. 15.

Figure 9:
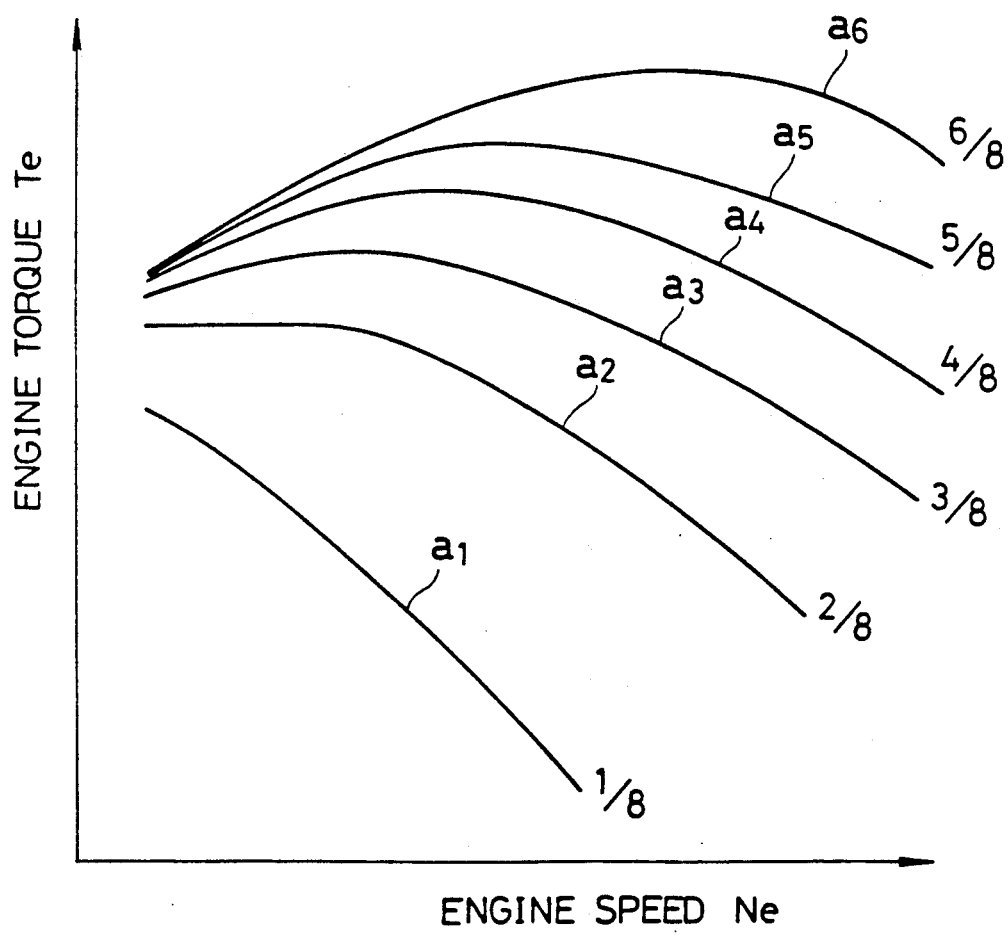
FIG. 9 is a graphical representation showing a relationship between engine torque, engine speed and the throttle opening.

In the normal slip condition, the control unit 100 obtains the engine output torque Te through the map of FIG. 9 in accordance with the engine speed Ne and the throttle opening Th in step S5. The torque Te is compensated by the compensating coefficient K1 to provide the transmitted torque Tr transmitted to the gear mechanism 26 (S6).

The torque Tr is compensated based on the change dTh of the throttle opening Th in light of the map as shown in FIG. 10 for providing the engine output with a good responsiveness against the throttle opening change in a transitive condition such as acceleration condition (S7).

Figure 16:
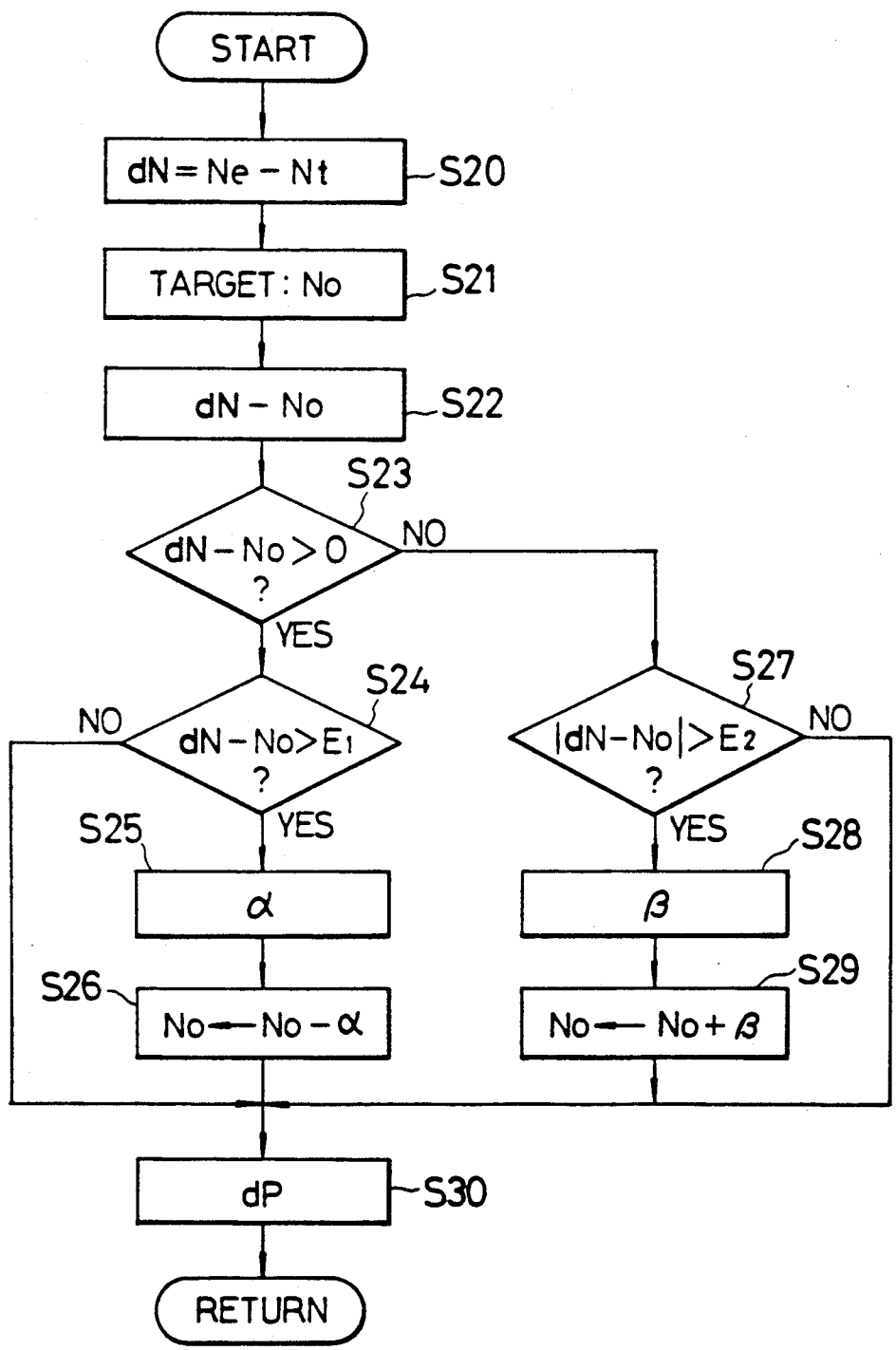

In step S8, the pressure difference dP is calculated. FIG. 16 shows a detailed procedure for obtaining the pressure difference dP. In FIG. 16, the control unit 100 calculates the actual speed difference dN by subtracting the turbine speed Nt or output speed of the torque converter 24 from the engine speed Ne or the input speed thereof in step S20. In step S21, the control unit 100 reads an initial value of the target speed difference No, for example 150 rpm. The deviation dN-No is calculated in step S22. Thereafter, a judgment is made as to whether the deviation dN-No is positive (S23). If the judgment is Yes, or if the deviation dN-No is positive, a further judgment is made as to whether or not the actual speed difference dN is greater than the target value No beyond the predetermined value E1 in step S24. If the judgment is Yes, or the difference between the values dN and No is more than the value E1, the compensating value $\alpha$ is determined in light of the map of FIG. 11 (S25). Then, the control unit 100 renews to optimize the target value No by subtracting the compensating value $\alpha$ from the value No (S26). That is, the optimized target value No is provided by a formula: No=No−$\alpha$.

On the other hand, if the judgment in step S23 is No, a further judgment is made as to whether or not the actual speed difference dN is smaller than the target value No beyond the predetermined value E2 in step S27. If this judgment is Yes or if the absolute value of the difference between the values dN and No is greater than the value E2, the compensating value $\beta$ is obtained through the map of FIG. 12 in accordance with the absolute value of the deviation dN-No. The control unit 100 provides an optimized target value No by adding the compensating value $\beta$ to the value No. That is, the optimized target value is provided by a formula; No=No+$\beta$ (S29). Thereafter, the control unit 100 obtains the pressure difference dP based on the optimized target value No and the transmitted torque Tr through the map of FIG. 8.

Next, the control unit 100 goes to step S9, and obtains the duty ratio Dk corresponding to the throttle opening Th through the map of FIG. 7. The final value of the duty ratio d is calculated in step S10 and the control unit 100 produces a control signal of the duty ratio d for driving the pressure adjusting solenoid valve 7 (S19).

Detail of the procedure for obtaining the final value of the duty ratio d will be explained hereinafter referring to a flow chart of FIG. 17.

Figure 17:
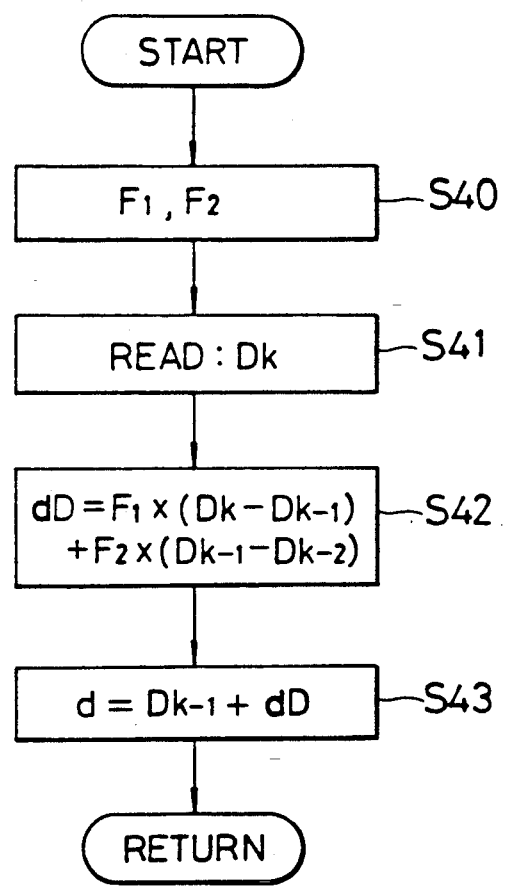

As shown in FIG. 17, the control unit 100 determines the compensating coefficients F1 and F2 based on the deviation dN-No through the map of FIG. 13 (S40).

The coefficients F1, F2 are increased as the absolute value of the deviation dN-No is increased in both positive and negative sides. In step S41, the control unit 100 reads the duty ratio Dk obtained in step S9 of the current processing cycle of the routine.

In step 42, the control unit 100 calculates an increment dD by utilizing the following formula;

$$dD = F1(Dk - D(k-1)) + F2(D(k-1) - D(k-2)),$$

wherein $D(k-1)$ is a duty ratio obtained in the preceding processing cycle in the routine, and $D(k-2)$ is a duty ratio obtained in a processing cycle preceding by two cycles, the current cycle.

The final value d is provided in step S43 as follows:

$$d = D(k-1) + dD$$

Under the deceleration slip control condition (S3) in FIG. 14, the control unit 100 obtains a minimum torque which can be transmitted through the torque converter 24 in light of a map in step S12. The minimum torque is obtained through experiments and stored in accordance with the engine speed Ne in the memory of the control unit 100. In this case, the minimum torque is considered to be a torque which is transmitted from vehicle wheels to the engine.

Then, the procedure goes to step S6, and the pressure difference dP is obtained in accordance with the minimum transmitted torque (S7, S8). The duty ratio r is determined in the same procedure as the normal slip control condition as aforementioned (S9, S10). Then, the pressure adjusting solenoid 7 is driven based on the duty ratio r to carry out the deceleration slip control.

Under the shift slip control condition (S4), the control unit 100 judges whether or not the shift slip control is in an initial stage (S13). If the shift slip control is in the initial stage, the control unit 100 further judges whether the precedent condition is the converter condition, the lock-up condition or other slip control conditions in step S14.

If the precedent condition is a slip control condition, the control unit 100 sets the duty ratio r at a value which is set just prior to a shift operation in the precedent slip control (S15).

The value set in step S15 is employed as the final value of the duty ratio r (S18) and used for controlling the solenoid valve 7 (S19).

In step S14, if the precedent condition is the converter condition or the lock-up condition, the control unit 100 obtains the torque Ti based on the engine speed Ne and the throttle opening Th (S16) and the duty ratio r based on the pressure difference dP and the torque Tr (S17) similar to the normal slip control condition. The duty ratio r is employed as the final value (S18) and used for driving the solenoid valve 7 (S19).

Figure 15:
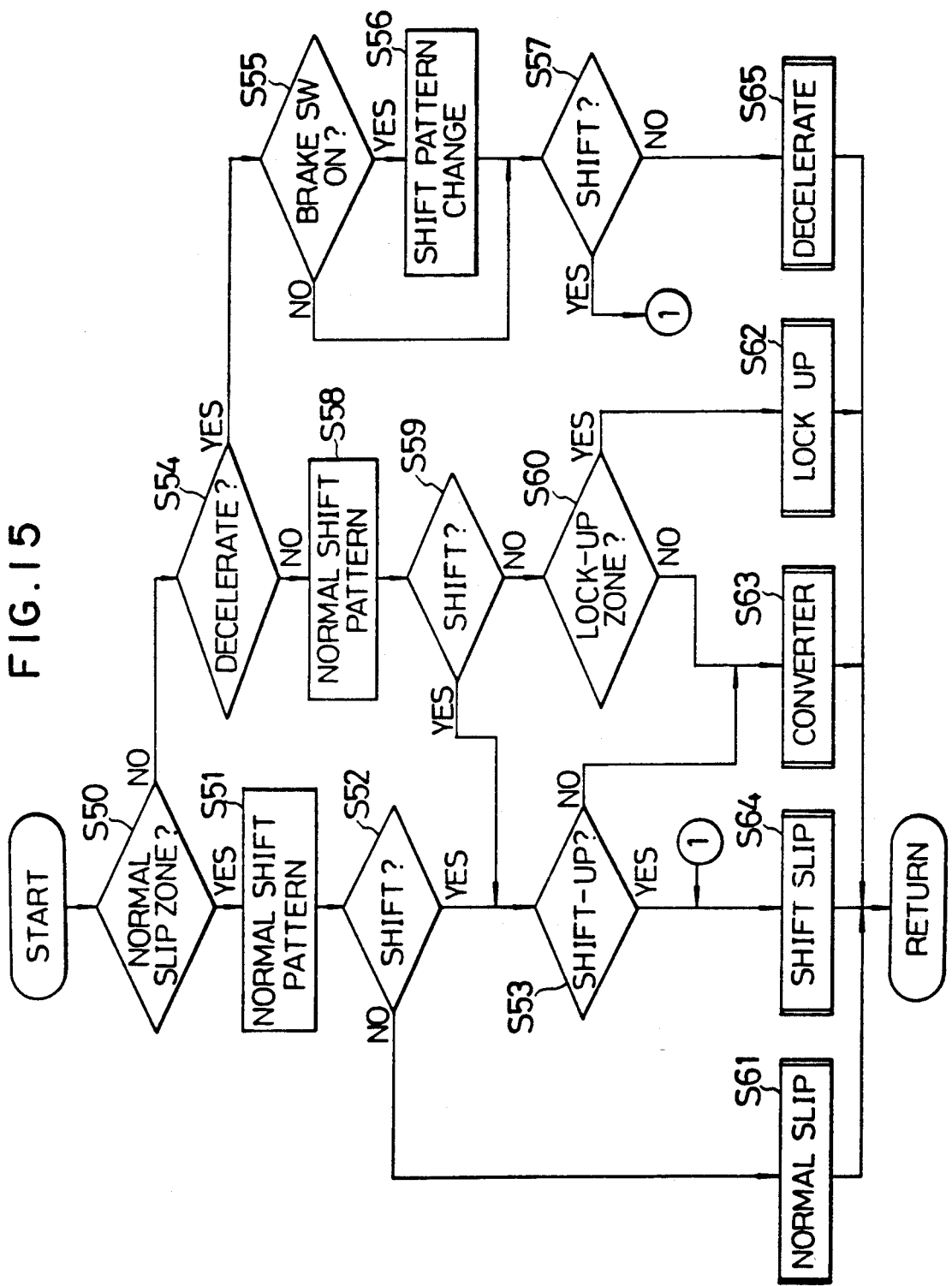

Referring to FIG. 15, there is shown a flow chart for determining a control condition on which the control unit 100 carries out a specific control.

In step S50, the control unit 100 judges whether or not the vehicle operating condition is in a control zone in which the normal slip control is made in light of the shift pattern of FIG. 4 based on the throttle opening Th and the vehicle speed V. If the vehicle operating condition is in the control zone of the normal slip control, the control unit 100 confirms that the 4-3 shift down control line Df is set at a normal position (S51). This is because the control line Df is shifted under a specific decelerating condition so as to improve an engine brake effect.

Then, the control unit 100 judges whether or not the vehicle operating condition is under a shift condition in light of the shift pattern of the normal position (S52). If the vehicle is not in the shift condition, the control unit 100 carries out the normal slip control (S61). If the vehicle is in the shift condition, the control unit 100 carries out the shift slop control (S64) in the case of an up-shift operation and carries out a converter control (release the lock-up clutch 21) in the case of a down-shift operation.

When the vehicle operating condition is in a condition other than the normal slip control condition, the control unit 100 judges whether or not the deceleration skip control condition is satisfied (S54). If the deceleration slip control condition is satisfied, a further judgment is made as to whether or not the brake is under operation in terms of a brake switch (S55). If the brake is under operation, the control unit 100 shifts the 4-3 shift-down control line Df to enhance the engine brake effect.

Then the control unit 100 judges whether or not the vehicle is in a shaft condition (S57). If Yes, the control unit 100 carries out the shift slip control (S64). If No, the deceleration slip control is made. When the deceleration slip control condition is not satisfied in step S54, the control unit 100 confirms that the 4-3 shift-down control line Df is in the normal position (S58). The control unit 100 returns the line Df to the normal position if it is in the shifted position. Then, the control unit 100 judges whether or not the vehicle is in a shift condition (S59). If Yes, and the shift condition is of an up-shift operation (S53), the control unit 100 carries out the shift slip control (S64). If Yes in step S59 and the shift condition is of a down-shift operation, the control unit 100 carries out the converter control (S63).

If No in step S59, a further judgment is made as to whether or not the vehicle operating condition is in a control zone in which the lock-up control is made (S60). If this judgment is Yes, the lock-up control is carried out (S62). If No, the converter control is made (S63). The converter control and the lock-up control is well known in the art so that a detailed explanation thereabout is omitted.

When the shift-down condition is satisfied in light of the shift pattern, the control unit 100 controls the solenoid valves 6 and 7 to release the lock-up clutch 21. When the deceleration slip condition and the shift-up condition are satisfied, the shift slip control is made. When a shift-down condition of 3-2 or 2-1 is satisfied in light of the shift pattern, the solenoid valves 6 and 7 are controlled to release the lock-up clutch 21.

The above slip control may be made based on a single factor of either the throttle opening as an engine load or the vehicle speed.

Hereinafter, another embodiment of the present invention is described making reference to FIGS. 18-20.

Figure 18:
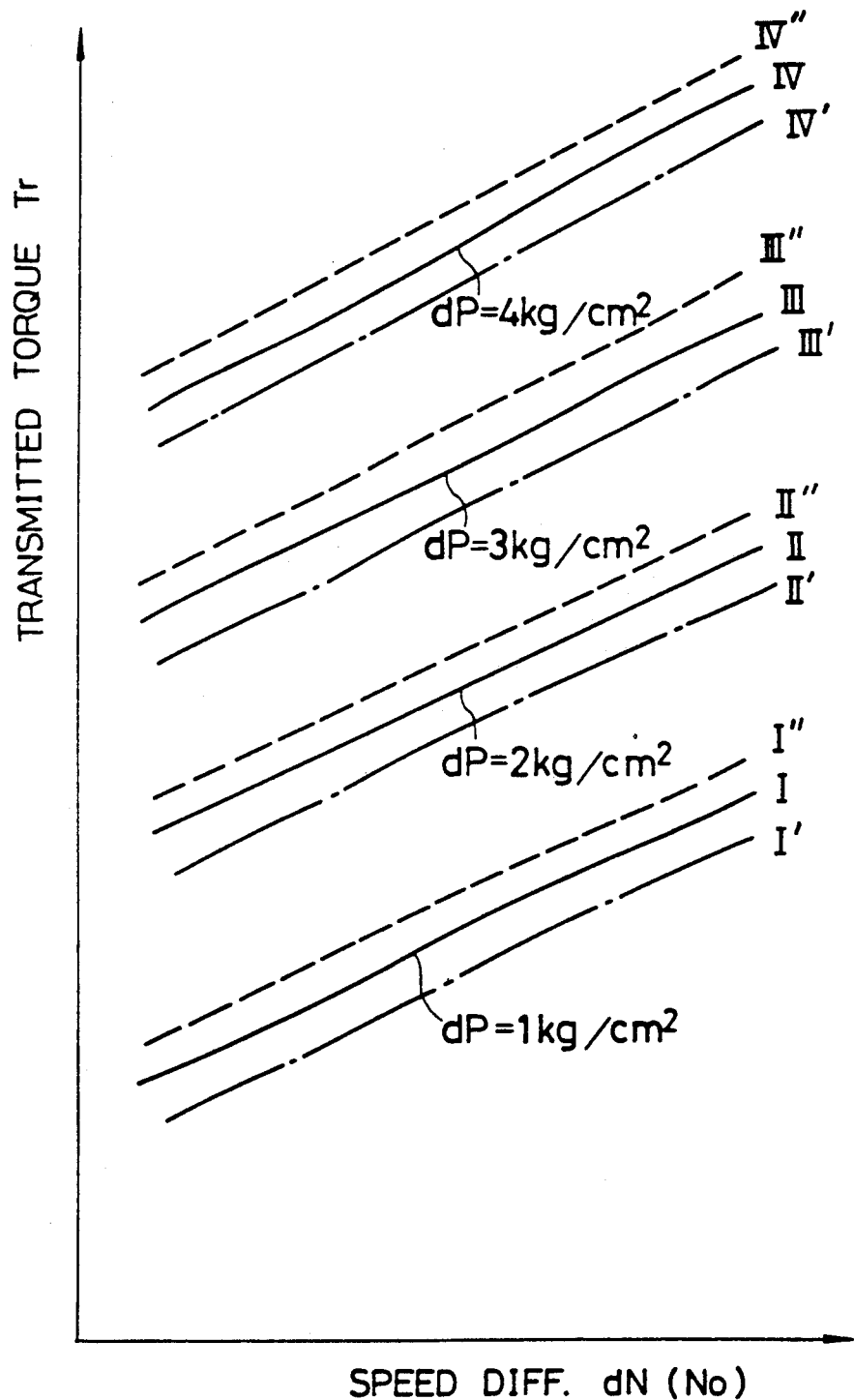
FIG. 18 is a graphical representation showing a relationship between input torque, speed difference and the pressure difference according to another embodiment of the present invention.

In this embodiment, the control unit 100 compensates the map of the pressure difference dP as shown in FIG. 18 under a certain condition.

Figure 19:
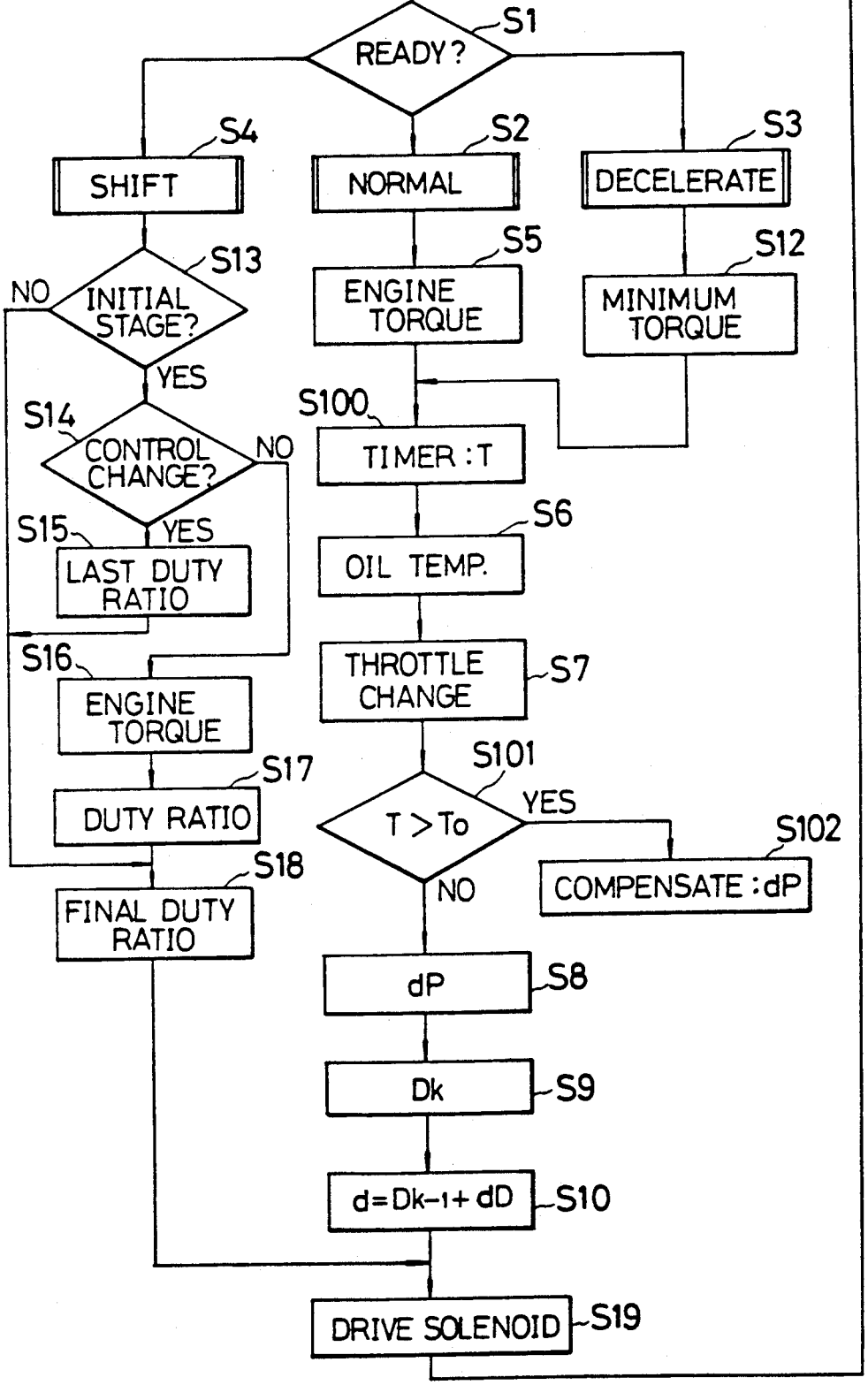
FIGS. 19–20 are flow charts of the slip control in accordance with another embodiment of the present invention.

Referring to FIG. 19, there is shown a flow chart of the slip control of the illustrated embodiment which is similar to FIG. 14. It will be understood that the control is provided with steps of setting timer T (S100) and compensating the map of the pressure difference dP in terms of the timer T (S101, S102).

In steps S101, S102, the control unit 100 counts the timer T and judges whether or not a predetermined set period To has passed. If the slip control goes on after the timer T expires, the control unit 100 compensates the pressure difference dP for facilitating the convergence of the speed difference dN.

Figure 20:
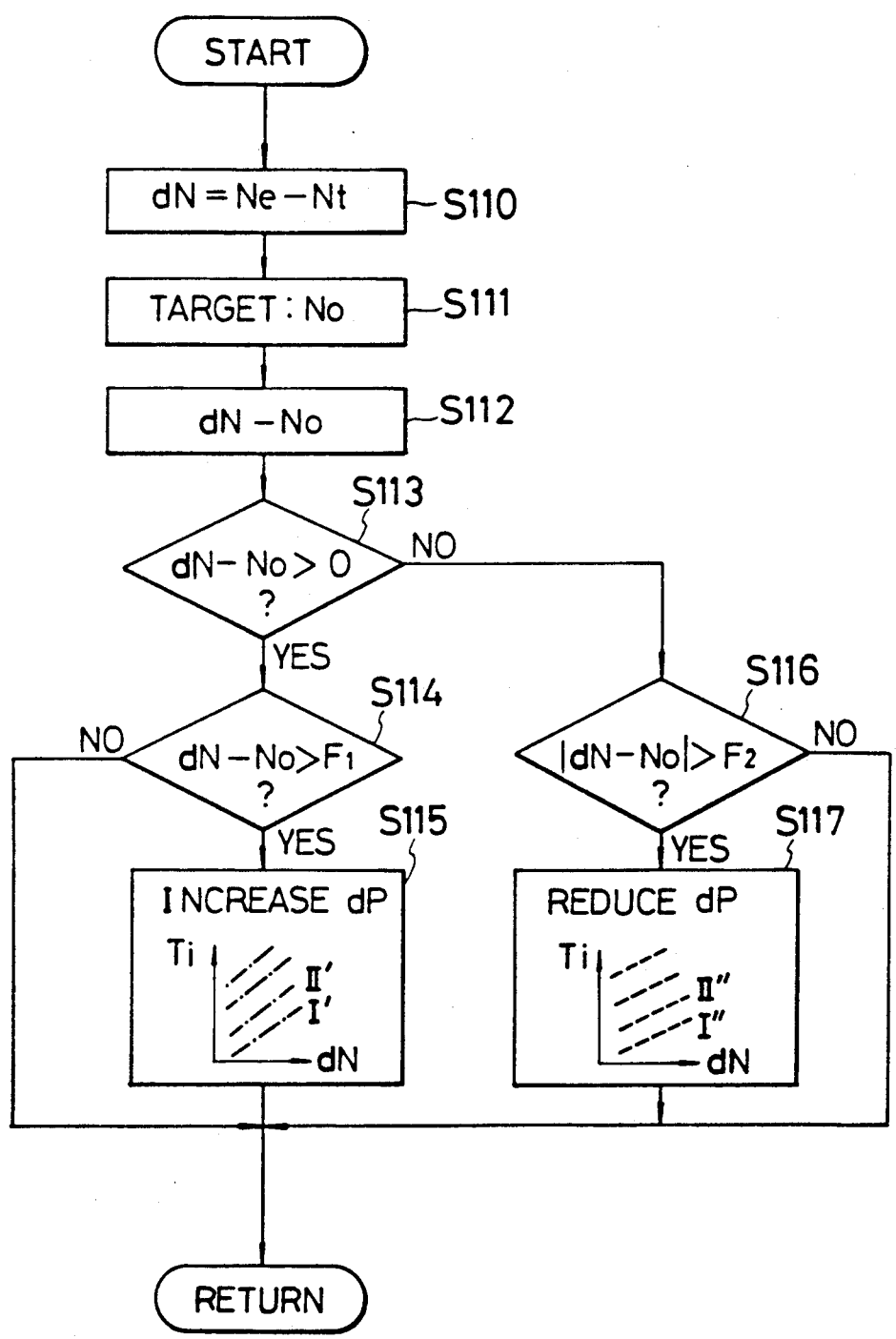

A procedure for compensating the pressure difference dP is described referring to FIG. 20.

In FIG. 20, the control unit 100 calculates the actual speed difference dN by subtracting the turbine speed Nt or output speed of the torque converter 24 from the engine speed Ne or the input speed thereof in step S110. In step S111, the control unit 100 reads an initial value of the target speed difference No, for example 150 rpm. The deviation dN-No is calculated in step S112. Thereafter, a judgment is made as to whether the deviation dN-No is positive (S113). If the judgment is Yes, or if the deviation dN-No is positive, a further judgment is made as to whether or not the actual speed difference dN is greater than the target value No beyond the predetermined value F1 in step S114. If the judgment is Yes or the difference between the values dN and No is more than the value F1, the control unit 100 compensates the map of the pressure difference dP in a manner that reference lines I, II, III, IV for dP=1 kg/cm2, dP=2 kg/cm2, dP=3 kg/cm2 and dP=4 kg/cm2 are shifted to lines I', II', III' and IV', respectively, in FIG. 18 (S115). Consequently, obtained value of the pressure difference dp is increased for the same values of the torque Ti and the speed difference dN so that the lock-up clutch 21 is controlled to reduce the slippage.

On the other hand, if the judgment in step S113 is No, a further judgment is made as to whether or not the actual speed difference dN is smaller than the target value No beyond the predetermined value F2 in step S116. If this judgment is Yes or if the absolute value of the difference between the values dN and No is greater than the value F2, the control unit 100 compensates the map of the pressure difference dP in a manner that reference lines I, II, III, IV for dP=1 kg/cm2, dP=2 kg/cm2, dP=3 kg/cm2 and dP=4 kg/cm2 are shifted to lines I'', II'', III'' and IV'', respectively, in FIG. 18 respectively (S117). Consequently, obtained value of the pressure difference dP is decreased for the same values of the torque Ti and the speed difference dN so that the lock-up clutch 21 is controlled to reduce the slippage.

The pressure difference dP may be compensated by a learning control wherein a learned value of the pressure difference dP is stored in place of an old one in the memory for next processing cycle of the routine.

It will be apparent that many modifications to and variations from the disclosed embodiments may be made based on the above descriptions by those skilled in the art without departing from the following scope of the claims.

We claim:

1. A slip control system for a torque converter of an automatic transmission of a vehicle comprising:
   a lock-up clutch device provided in said torque converter for directly connecting an input member and an output member of the torque converter to each other,
   engine speed detecting means for detecting a rotation speed of said input member,
   turbine speed detecting means for detecting a rotation speed of said output member,
   throttle opening detecting means for detecting an opening of a throttle valve,
   vehicle speed detecting means for detecting a vehicle speed,
   a temperature sensor means for detecting a temperature of hydraulic fluid for the automatic transmission,
   a hydraulic circuit, including a pressure regulating solenoid valve, for producing a pressure difference between a releasing chamber and an engaging chamber of the lock-up clutch device, and
   a control unit including
   (1) means for determining when said vehicle is in one of a shift slip control, a normal slip control and a deceleration slip control condition and, when said vehicle is in one of said normal slip control and deceleration slip control conditions,
   (2) means for determining an engine torque, based on the opening of said throttle valve and the rotation speed of said input member, when the vehicle is in said normal slip control condition,
   (3) means for determining a minimum torque in accordance with the rotation speed of said input member when the vehicle is in said deceleration slip control condition,
   (4) means for obtaining a transmitted torque from one of the engine torque and the minimum torque, said transmitted torque being increased as the temperature of said hydraulic fluid increases,
   (5) means for compensating said transmitting torque based on a change in the opening of the throttle,
   (6) means for determining a target speed difference, based on an actual speed difference between the rotation speed of said input member and the rotation speed of said output member, and providing an optimized speed difference by (a) reducing the target speed difference when the actual speed difference is greater, beyond a first predetermined value, than the target speed difference, and (b) increasing the target speed difference when the actual speed difference is smaller, beyond a second predetermine value, than the target speed difference,
   (7) means for obtaining a desired pressure difference between said releasing chamber and said engaging chamber based on the optimized speed difference and said transmitted torque, and
   (8) means for determining a duty ratio for said pressure regulating solenoid valve corresponding to the throttle opening and the pressure difference, and, when the vehicle is in said shift slip control condition,
   (9) means for setting the duty ratio for said pressure regulating solenoid valve at a vale set in a preceding condition if the preceding condition was one of said shift slip control, normal slip control and deceleration slip control conditions, and
   10) means for determining the duty ratio for said pressure regulating solenoid valve based on the pressure difference and the transmitted torque if the preceding condition was not one of said shift slip control, normal slip control and deceleration slip control conditions.

2. A slip control system as defined by claim 1, wherein said control unit further includes means for setting a timer and means for judging whether or not a predetermined set time period has passed.

3. A slip control system as defined by claim 2, wherein said control unit further includes means for compensating said desired pressure difference if the slip control continues after said predetermined set time period has passed.

4. A slip control system as defined by claim 3, wherein means for compensating said desired pressure difference compensates said desired pressure difference by shifting reference lines on a map.

* * * * *